H. W. Clarke,
Setting Fence Posts,
Nº 58,776.            Patented Oct. 16, 1866.
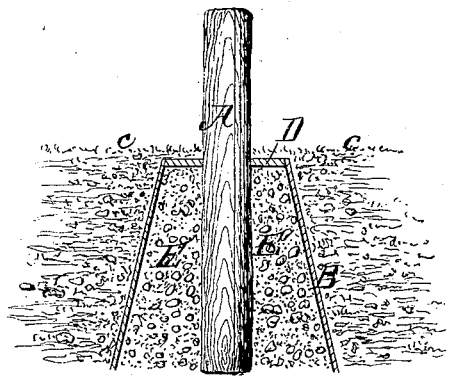
Witnesses;
George Andrews
Samuel N. Piper
Inventor;
Henry W. Clarke.
Per. R. H. Eddy
Atty.

UNITED STATES PATENT OFFICE

HENRY W. CLARKE, OF NEWPORT, RHODE ISLAND.

IMPROVEMENT IN SETTING FENCE-POSTS.

Specification forming part of Letters Patent No. 58,776, dated October 16, 1866.

*To all whom it may concern:*

Be it known that I, HENRY W. CLARKE, of Newport, in the county of Newport and State of Rhode Island, have made a new and useful invention having reference to the setting of posts in the ground in order to their protection from the action of frost; and I do hereby declare the same to be fully described in the following specification and represented in the accompanying drawing, which exhibits a vertical section of a post as set in the earth in accordance with my invention.

It is well known that in the ordinary manner of setting a post—that is, directly in the earth, or even in gravel or sand placed in a hole dug for the reception of such and the post—the post is very liable to be either lifted or inclined by the action of the frost, particularly in the spring when the frozen ground is in the act of thawing.

The purpose of my invention is to prevent such effects from the action of frost, and I am enabled to successfully accomplish such by surrounding the post by a conical mass of loose stones or coarse gravel, or the equivalent thereof, and a circumscribing frustum of a cone or pyramid, having its lesser base upward or uppermost, and stopped around the post by means of cement or other water-proof material.

In the drawing, A denotes the post; B, the hollow frustum, formed of metal, wood, or other suitable material; C C, the ground; D, the water-proof cement head in the frustum; E, the mass of stones or coarse gravel placed around the post and within the frustum, so as to fill it.

The larger base of the frustum being downward, the frost when in the earth surrounding it (the frustum) cannot operate to raise the frustum or throw it out of place. The top of the frustum being sealed around the post, the entrance of water through the upper part of the frustum and into the ground will be prevented. Thus the post will remain embedded in a mass of dry gravel, or whatever may be placed within the frustum as a substitute for such. Sand may be used instead of gravel. The post may go below the frustum, and the latter may be large enough to extend below the depth to which the frost usually penetrates the earth.

I am aware that it has long been customary to set a post in a mass of brick-work of a conical or tapering form built in the earth around the post, the larger base of the mass being downward. This is a very expensive mode of setting a post, which I seek to avoid by my invention.

I am also aware that a post has been set in coarse gravel or loose stones arranged about it, and in a post-hole dug in the earth. This latter mode of setting a post will not always prevent frost from either lifting or throwing it out of its normal position.

The hollow frustum closed at top, and arranged so as to circumscribe a mass of gravel or its equivalent, is not only thoroughly efficient, but is a cheap mode of accomplishing the desired result.

What, therefore, I claim as my invention is—

The arrangement and application of the hollow frustum B, its cement or head D, and the mass of gravel E, or its equivalent, with a post, A, the whole being substantially as and for the purpose set forth.

HENRY W. CLARKE.

Witnesses:
WILLIAM A. WHITE,
DAVID FALE.